Figure 15:
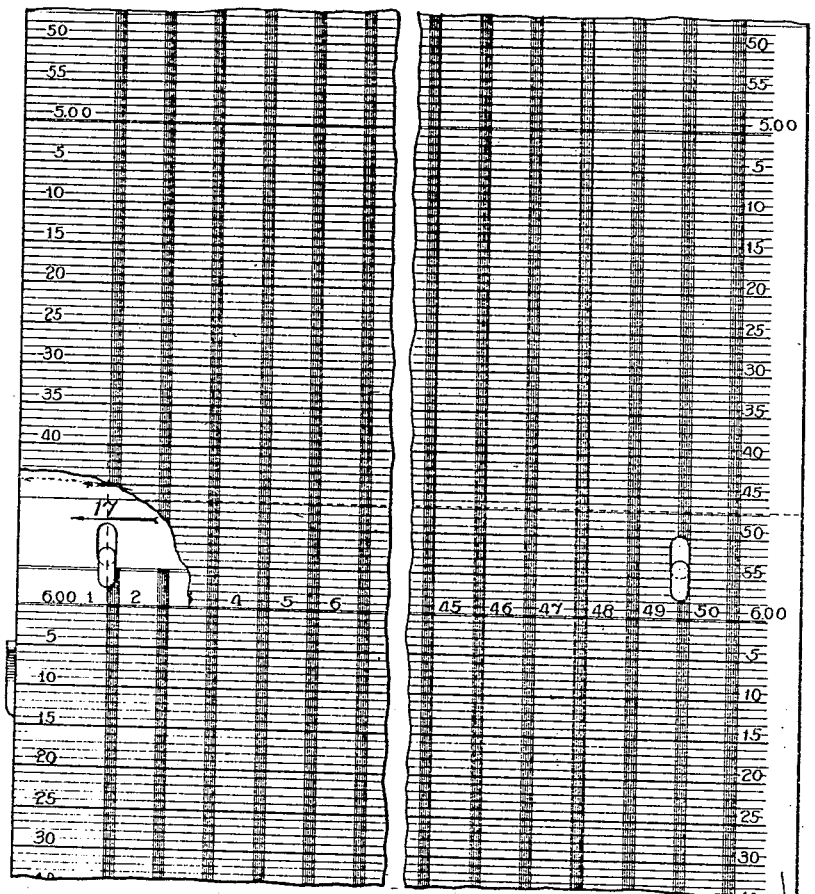

P. A. COONEY.
MACHINE RECORDER.
APPLICATION FILED OCT. 5, 1910.
1,285,049.
Patented Nov. 19, 1918.
13 SHEETS—SHEET 1.
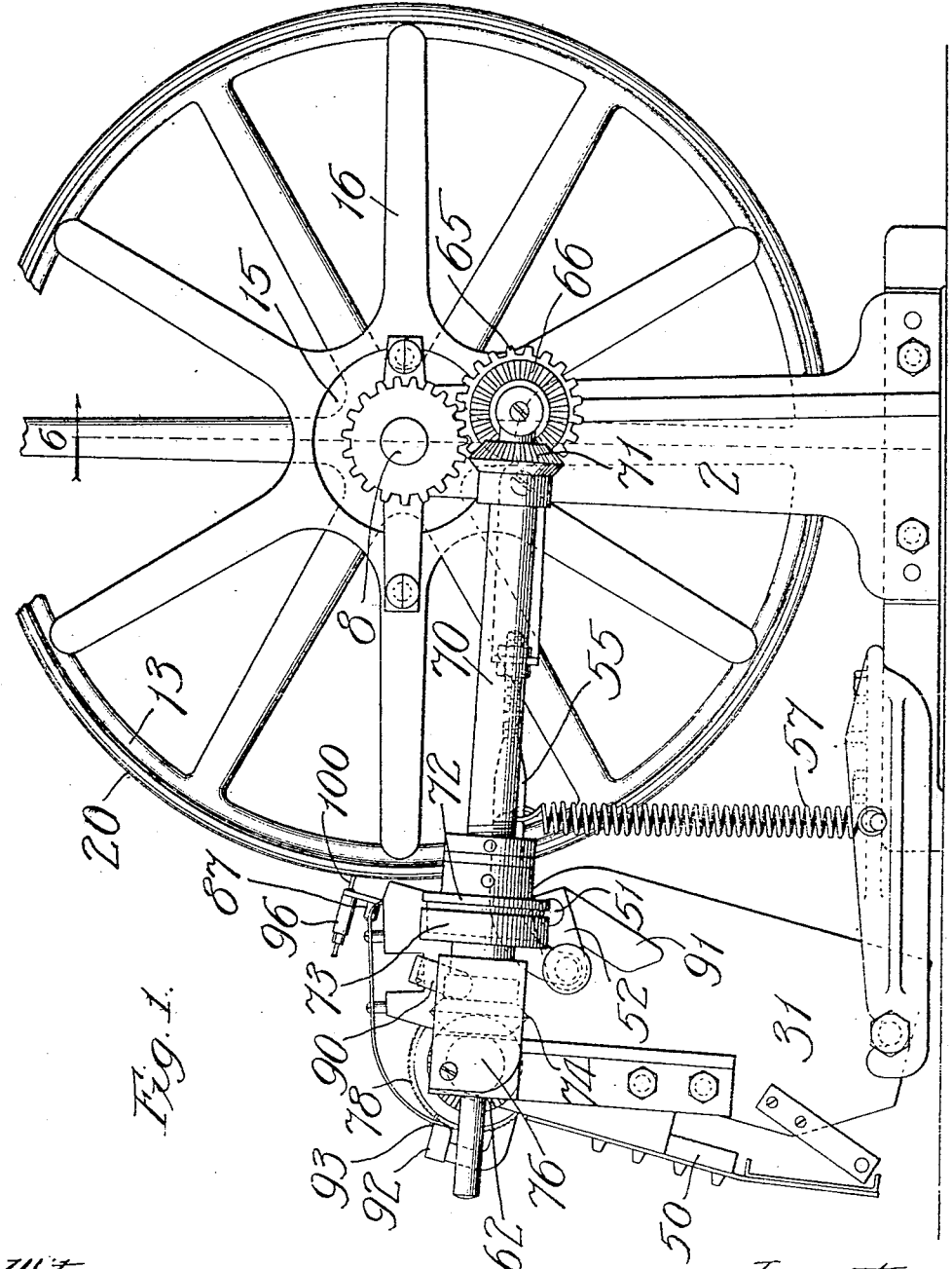

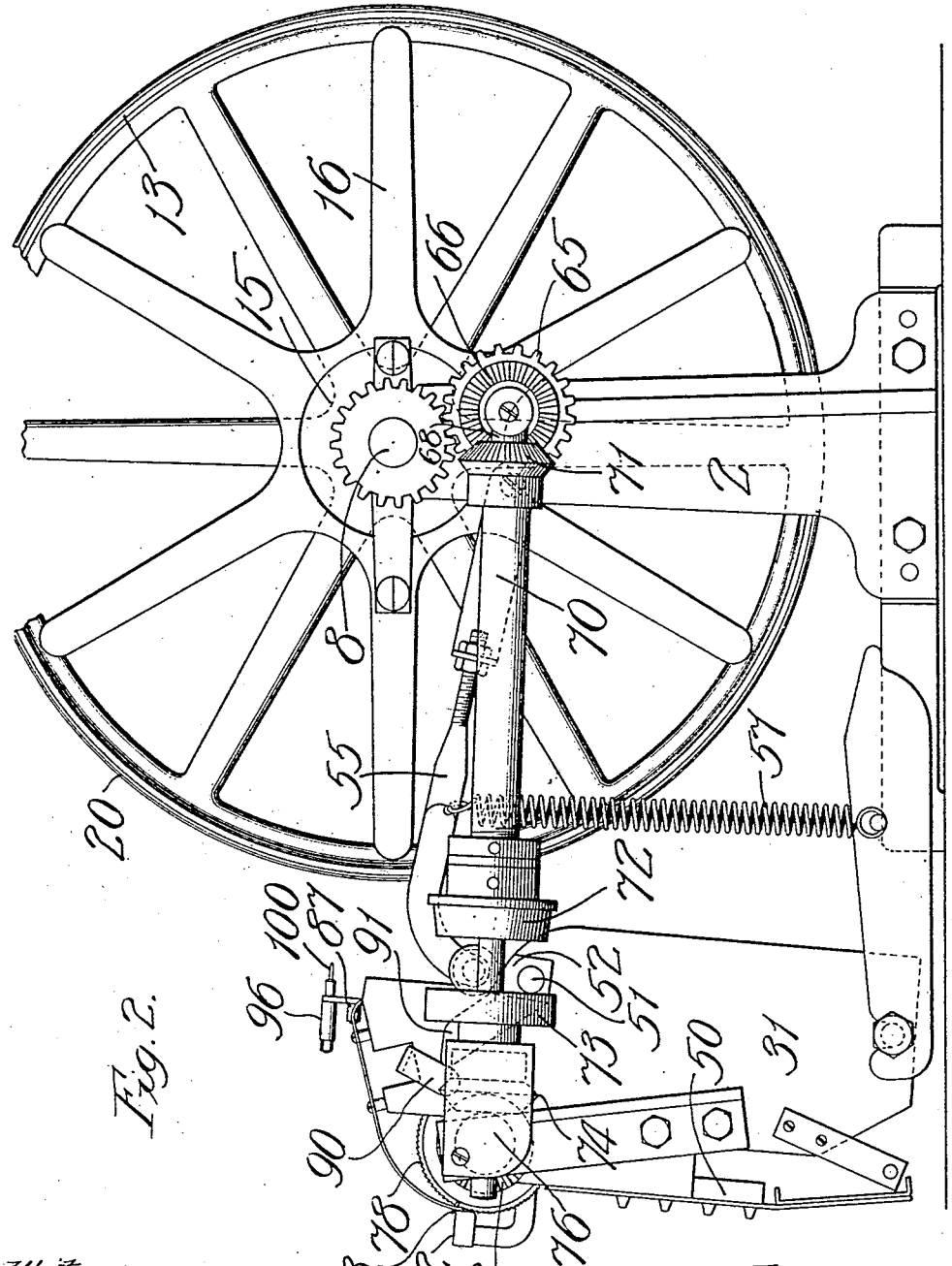

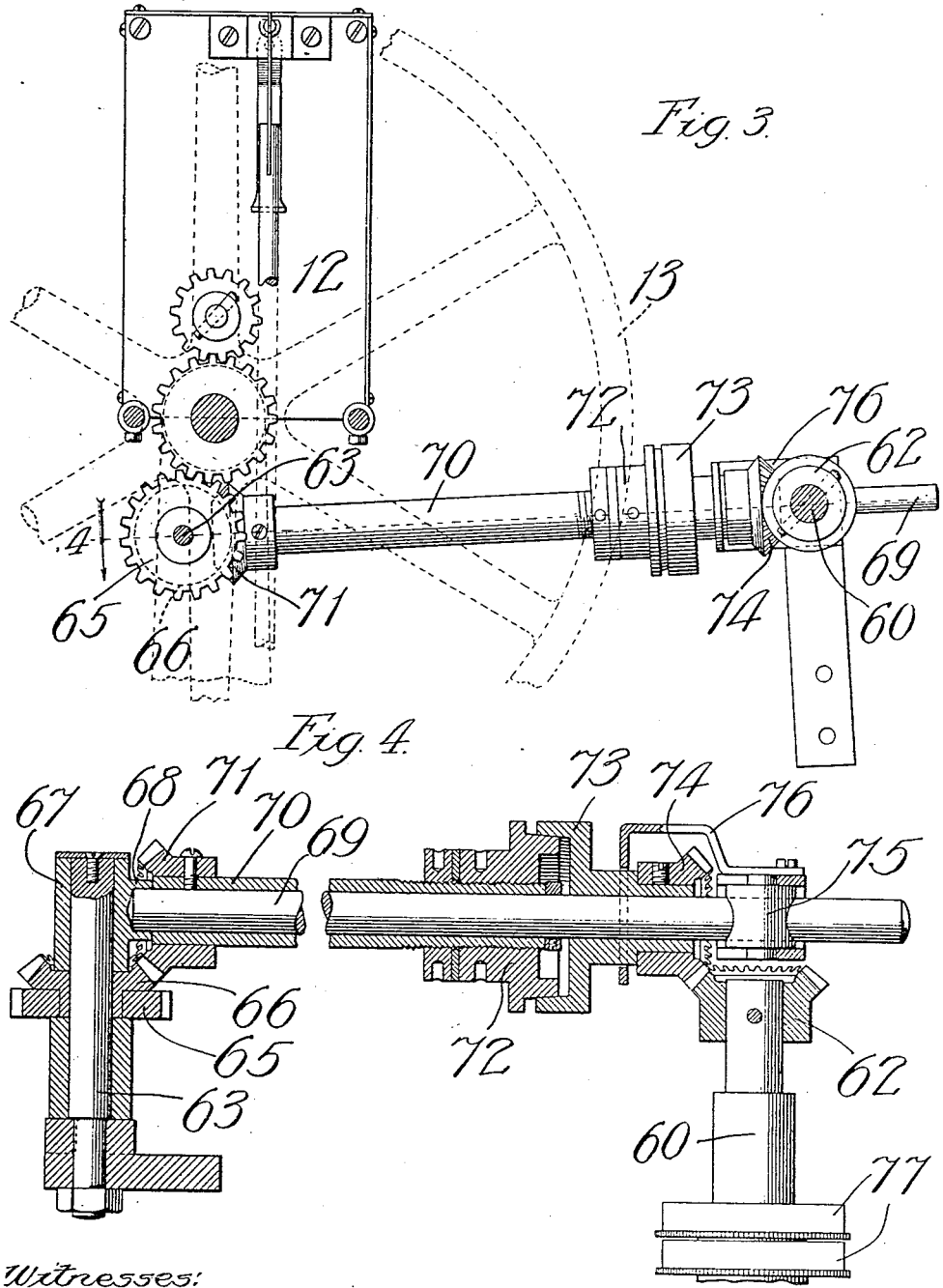

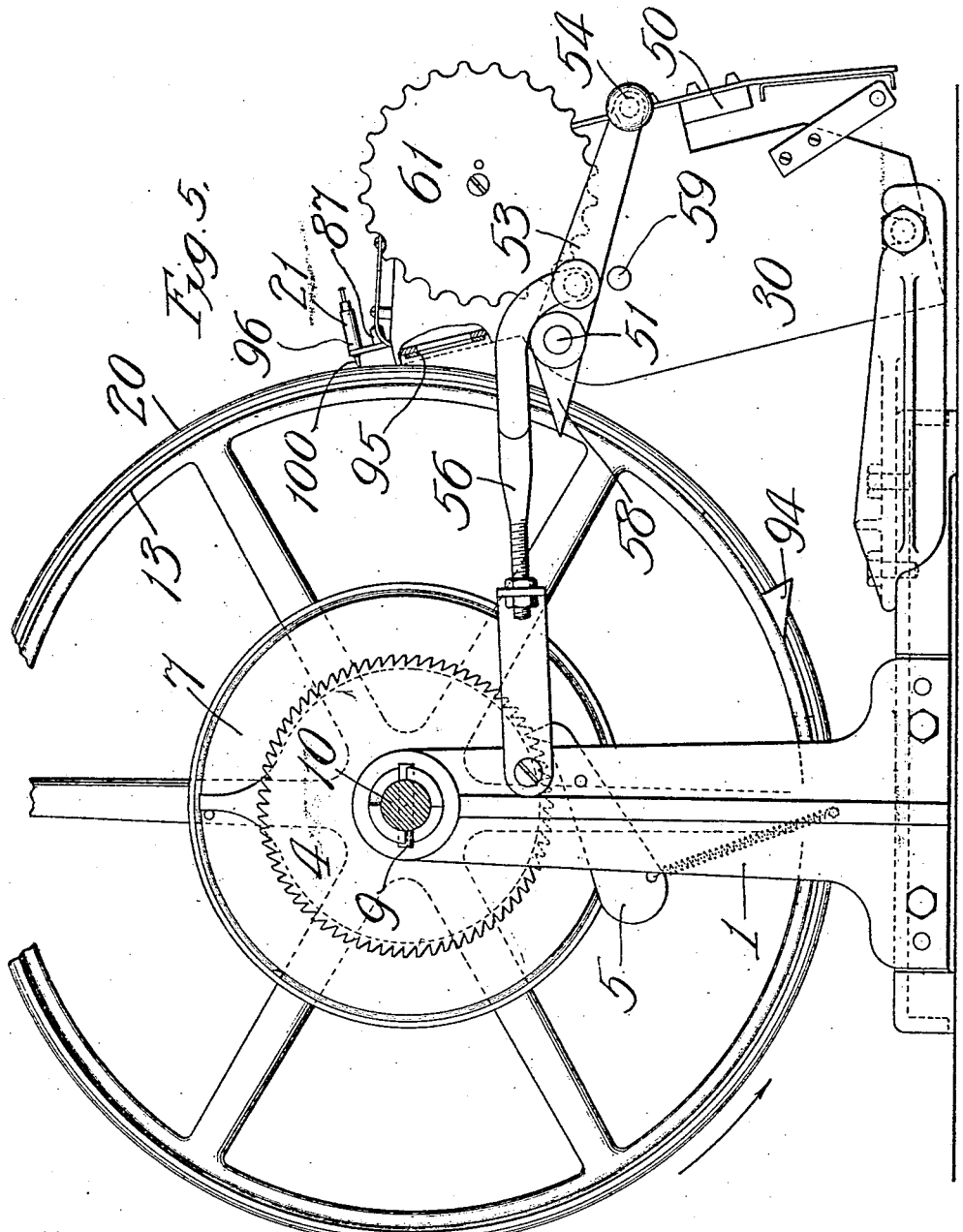

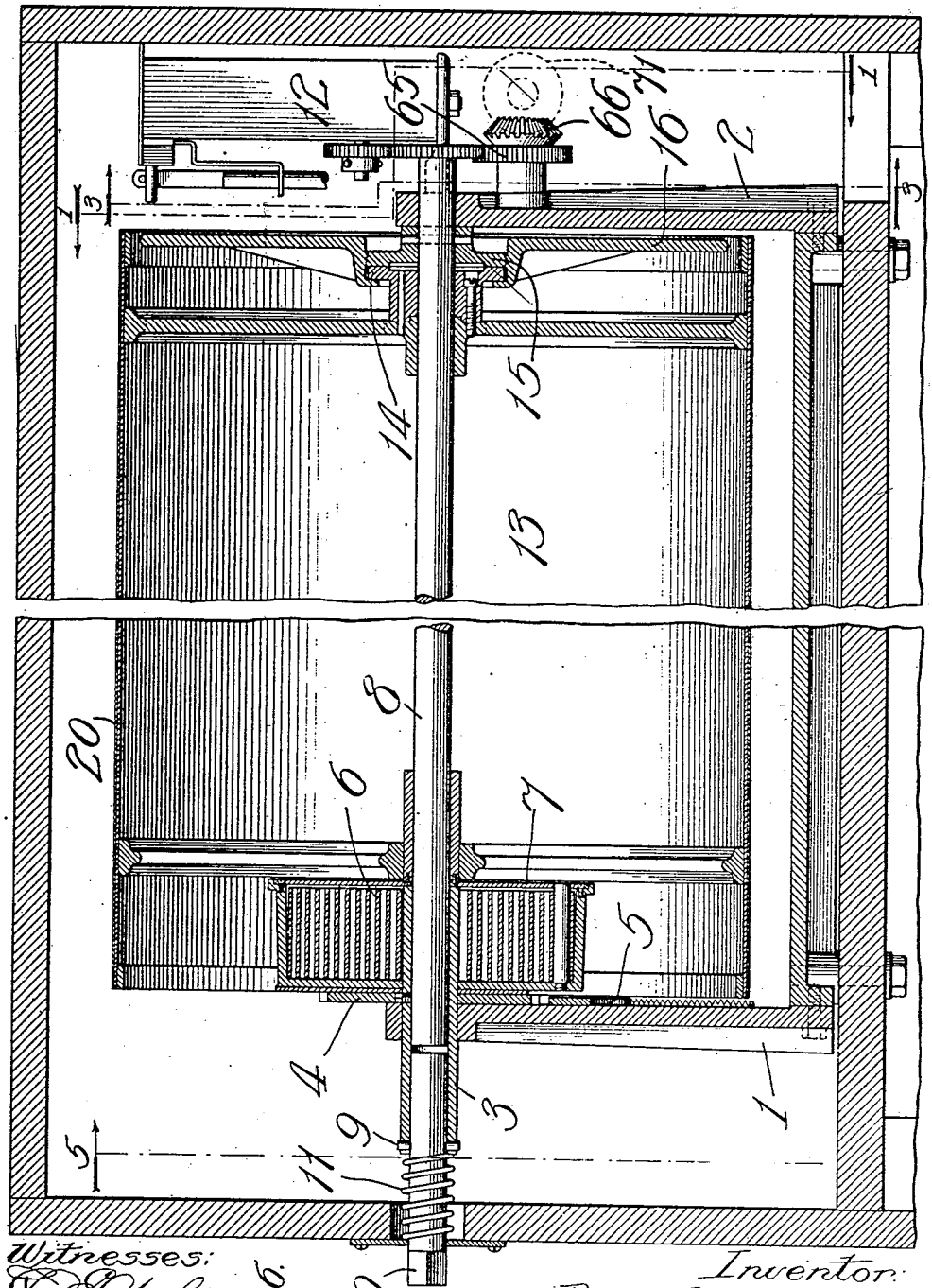

P. A. COONEY.
MACHINE RECORDER.
APPLICATION FILED OCT. 5, 1910.
1,285,049.
Patented Nov. 19, 1918.
13 SHEETS—SHEET 6.
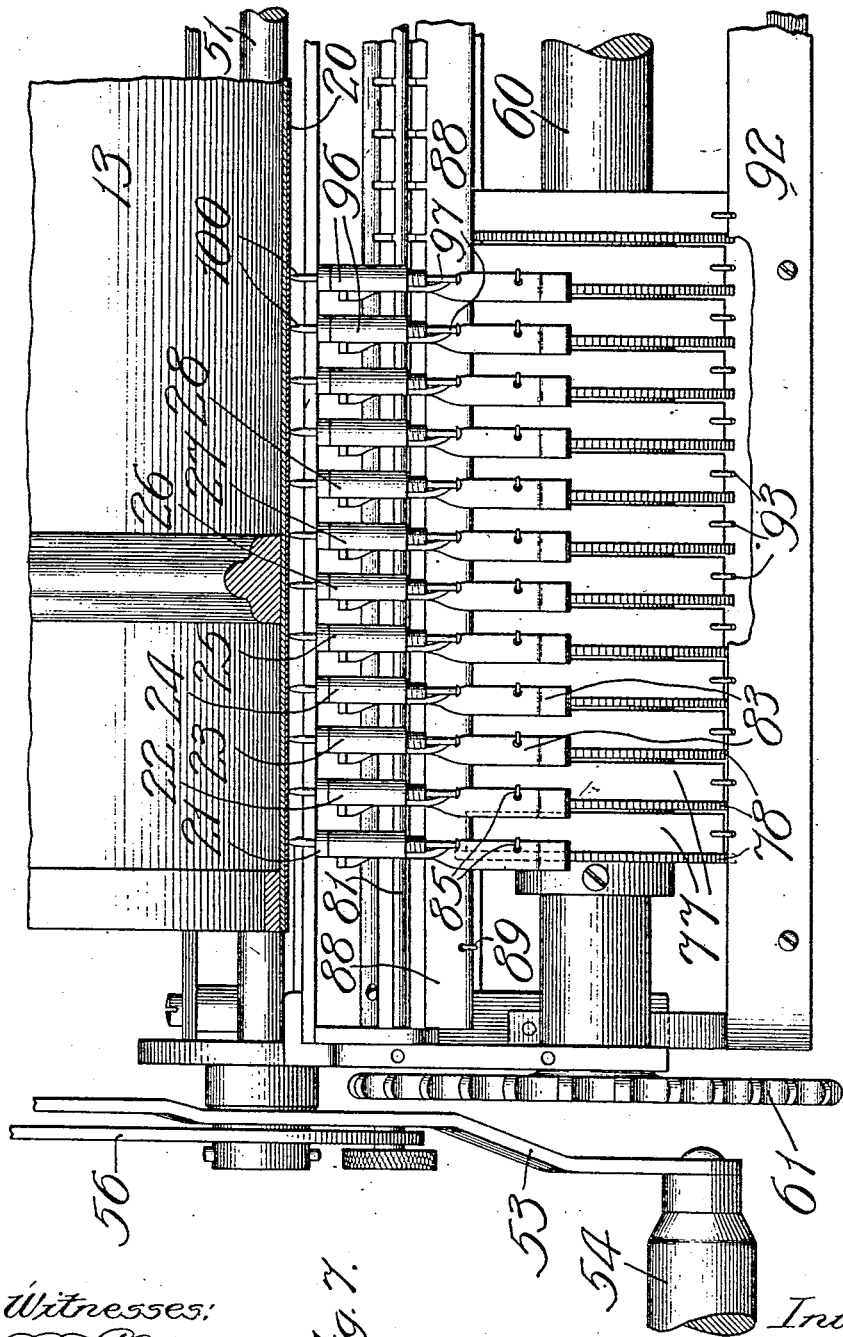

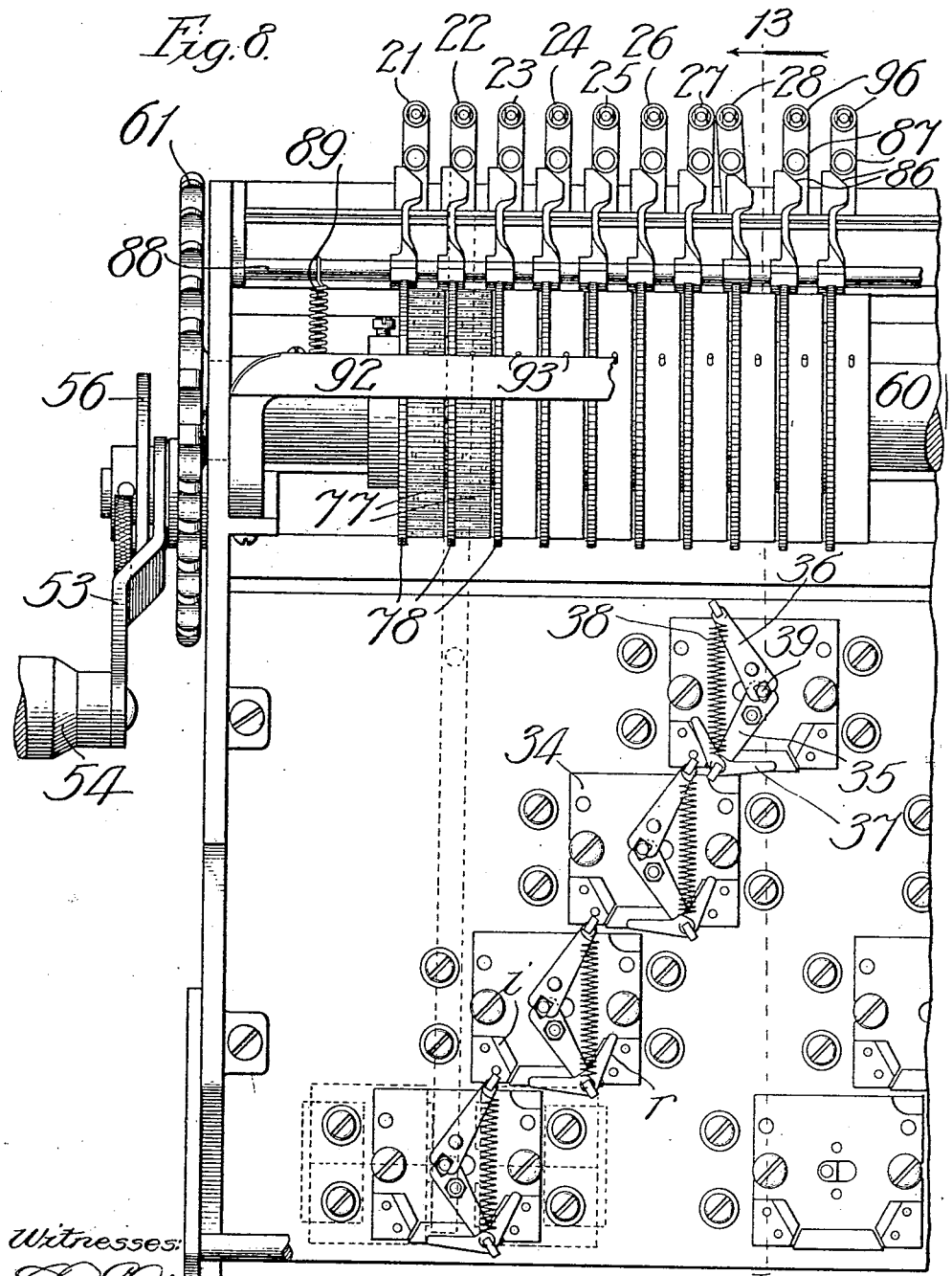

P. A. COONEY.
MACHINE RECORDER.
APPLICATION FILED OCT. 5, 1910.
1,285,049.
Patented Nov. 19, 1918.
13 SHEETS—SHEET 8.
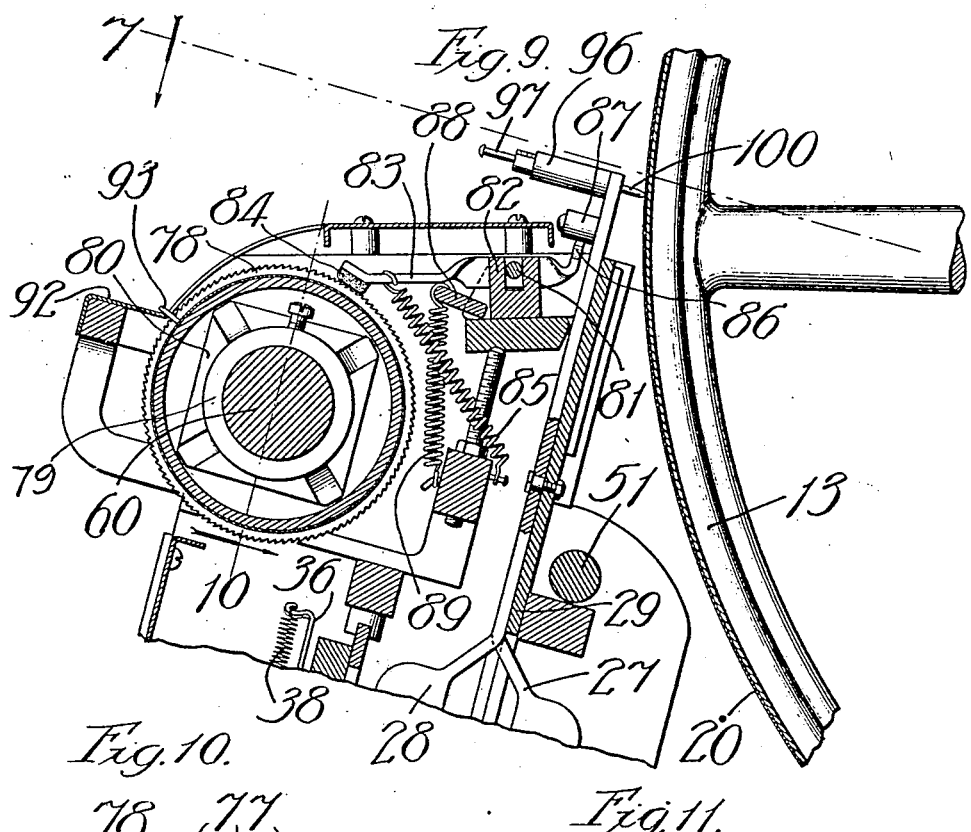
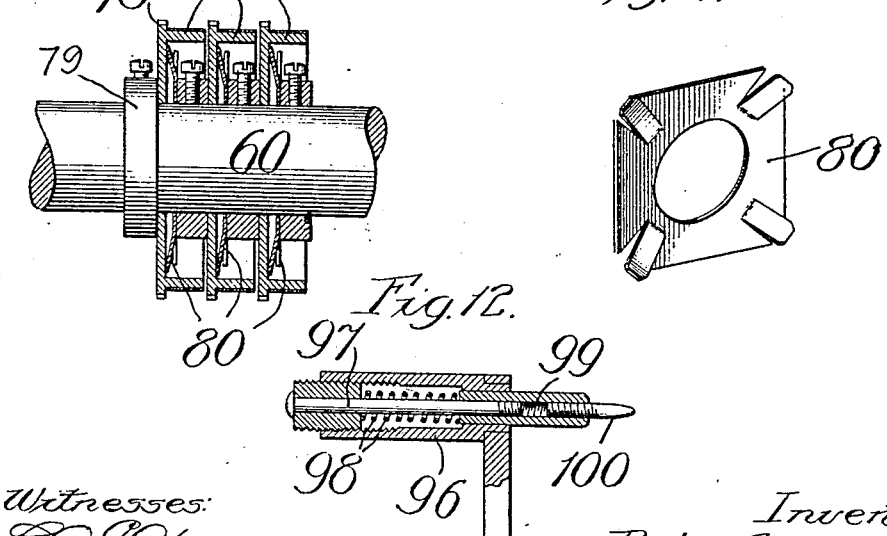
Witnesses:
Inventor:
Peter Albert Cooney.
Attys.

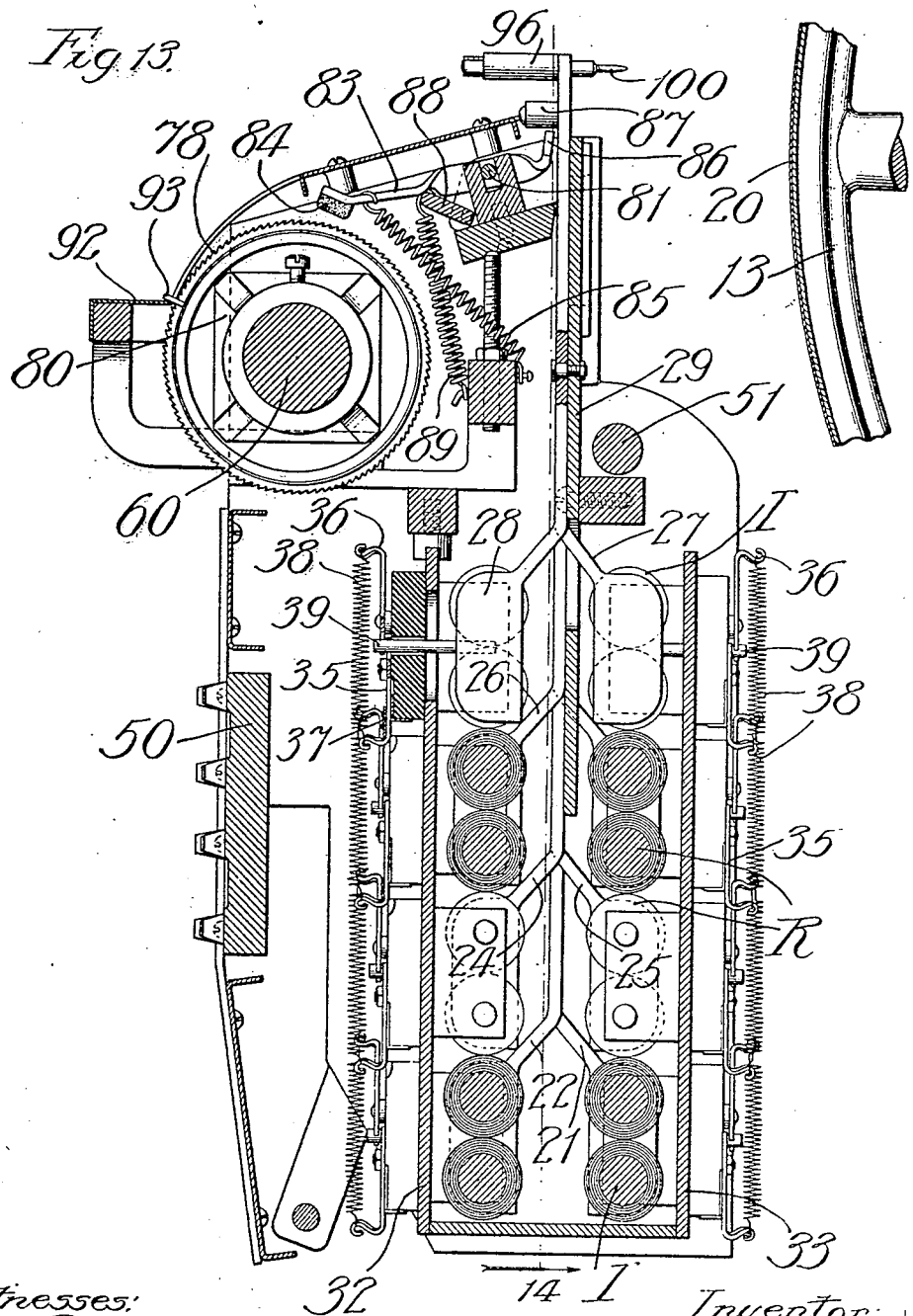

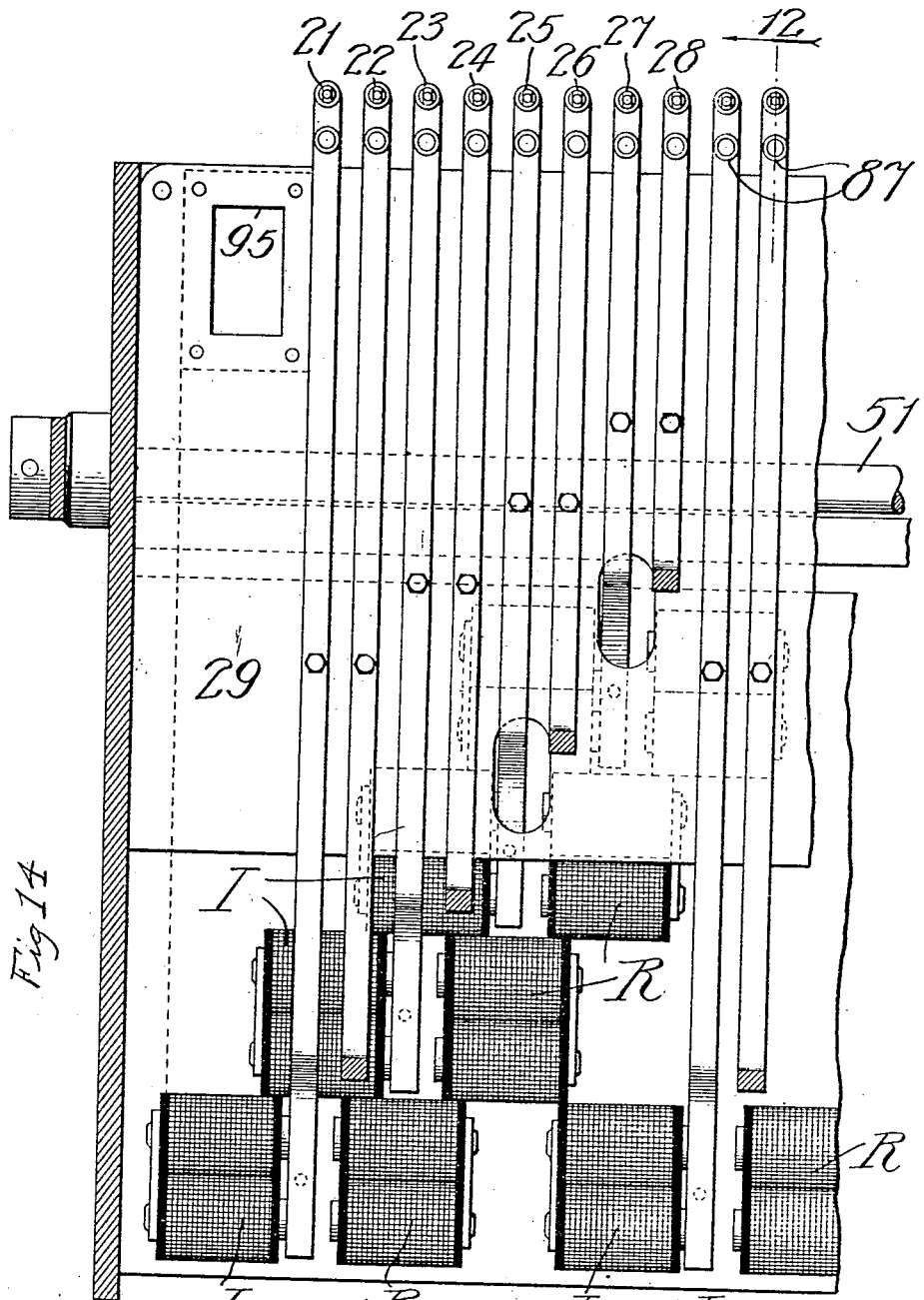

P. A. COONEY.
MACHINE RECORDER.
APPLICATION FILED OCT. 5, 1910.

1,285,049.

Patented Nov. 19, 1918.
13 SHEETS—SHEET 11.

Witnesses:

Inventor:
Peter Albert Cooney.

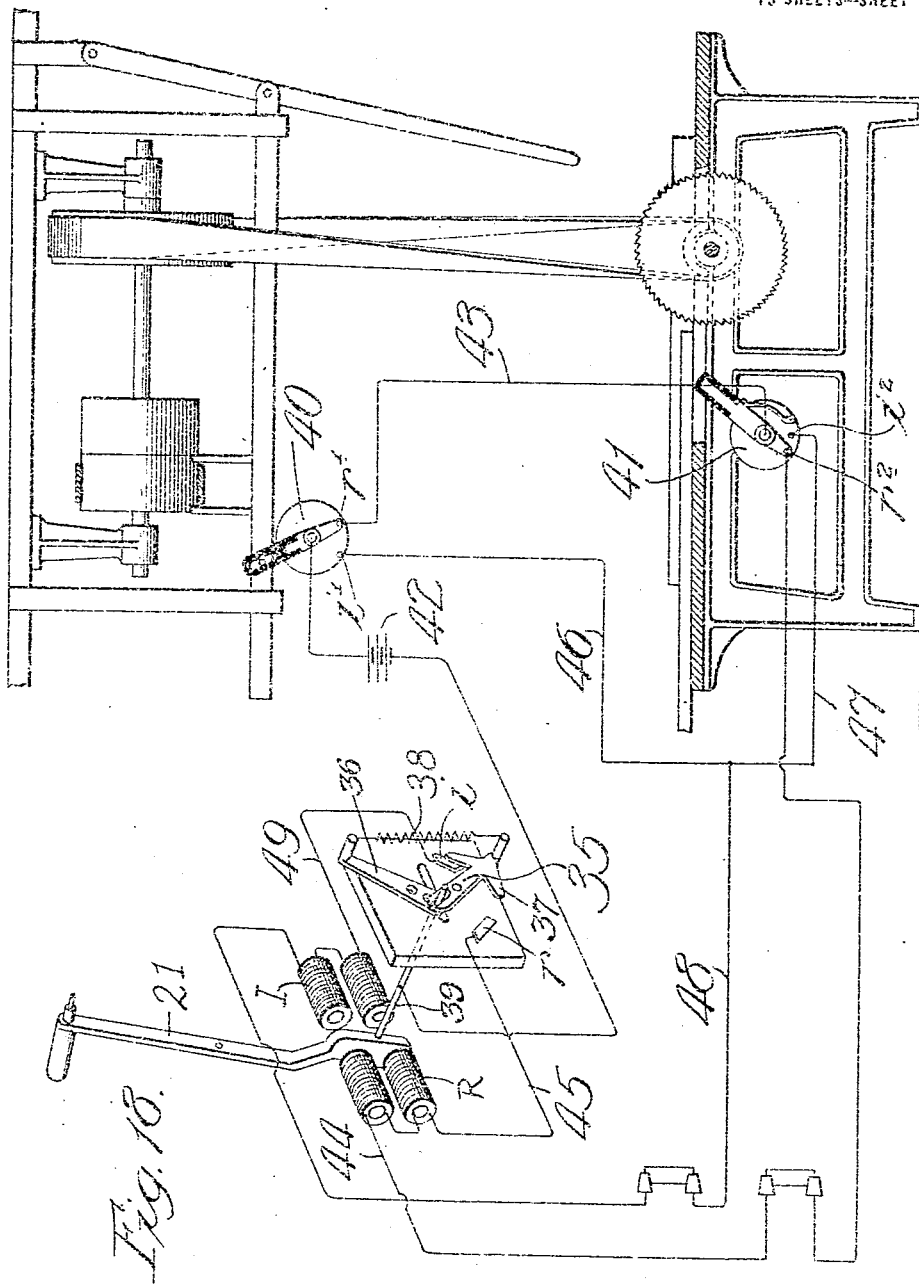

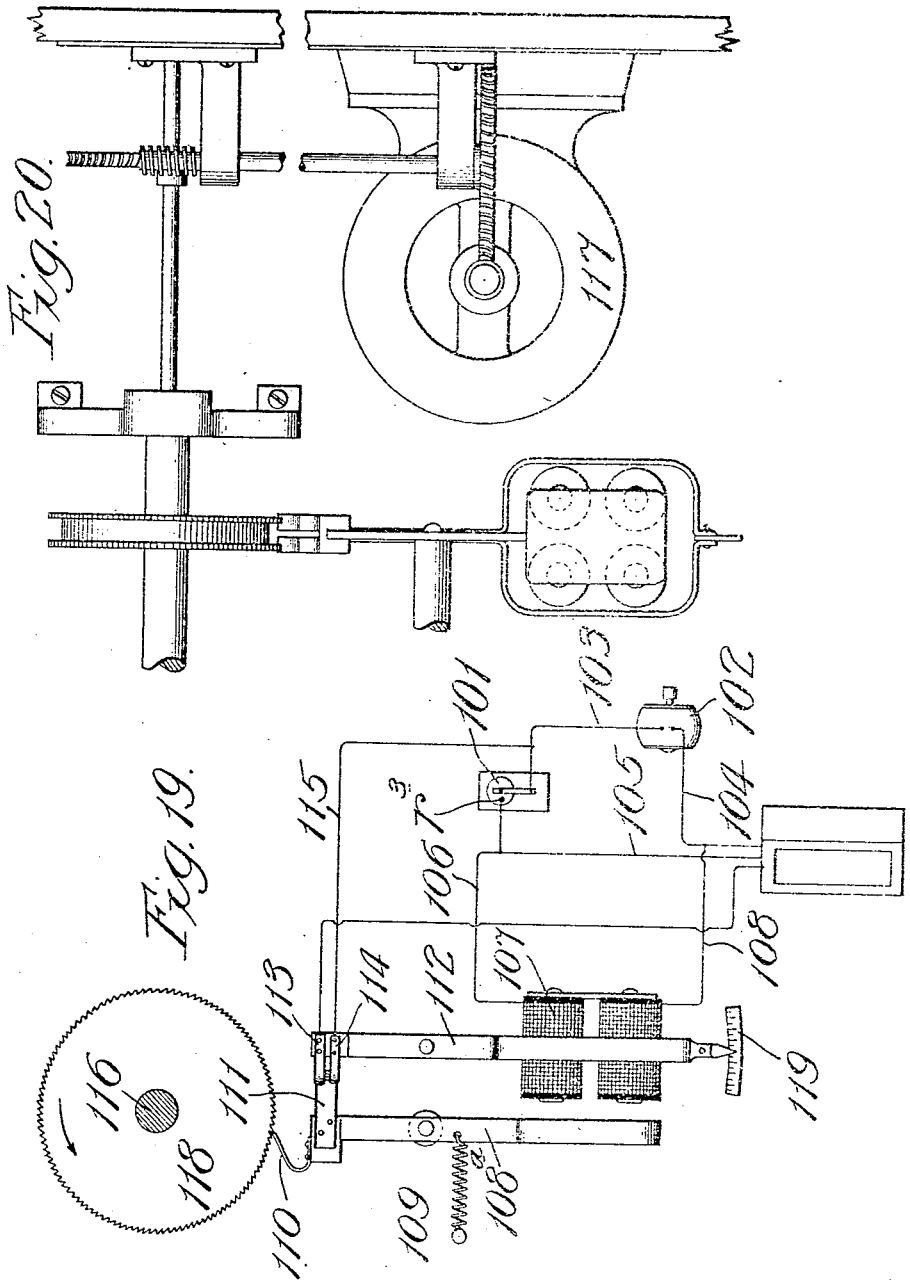

UNITED STATES PATENT OFFICE.

PETER ALBERT COONEY, OF CHICAGO, ILLINOIS, ASSIGNOR, BY MESNE ASSIGNMENTS, OF ONE-HALF TO ILLINOIS MACHINE RECORDER CO., OF CHICAGO, ILLINOIS, A CORPORATION OF ILLINOIS, AND ONE-HALF TO WILLIAM H. DYRENFORTH, OF CHICAGO, ILLINOIS.

MACHINE-RECORDER.

1,285,049.  Specification of Letters Patent.  Patented Nov. 19, 1918.

Application filed October 5, 1910. Serial No. 585,395.

*To all whom it may concern:*

Be it known that I, PETER ALBERT COONEY, a citizen of the United States, residing at Chicago, in the county of Cook and State of Illinois, have invented a new and useful Improvement in Machine-Recorders, of which the following is a specification.

My invention relates to improvements in machine recorders, that is, devices which are designed to make a record of the amount of time during which the various machines in a factory are occupied in productive work and the length of time during which they are idle. Certain parts of the present mechanism are quite similar to those which have been known in the past, while other parts are believed to be decidedly novel, the old mechanism being arranged to coöperate therewith so that certain distinctive features of operation are produced. The mechanism is necessarily illustrated in a considerable number of views and for the purpose of making description of certain views, as well as the details and description of the mechanism, more readily intelligible, the general construction and mode of operation will be set forth by way of preface. The machine is provided with a large drum on which is wound a sheet of chemically-prepared paper, provided with colored longitudinal rulings and transverse rulings indicating the divisions of the day. A marker is provided for each machine whose work is to be recorded, each marker normally resting on one of the longitudinal rulings on the sheet of paper, so that its mark is obscured by the dark color of the ruling. When a machine begins productive work, its corresponding marker moves off the longitudinal ruling and produces to one side thereof, a distinctive mark, the length of which indicates the amount of time the machine was run. Throughout the operation of the recorder the markers rest upon the paper with an equal pressure, so that the resistance to be overcome by the clock-movement which drives the drum is uniform at all times and the speed of the drum can therefore readily be made perfectly regular, whereas in systems of a similar kind where the markers are lifted off the paper, considerable irregularities in speed have resulted.

Each marker is provided with a pair of electro-magnets, one to move it into the idle and the other into running position, and mechanism is provided, under the control of these markers, so that when one completes its movement in one direction, it immediately interrupts the current running through the corresponding electro-magnet and closes one break in the circuit of the other electro-magnet in preparation for the energizing thereof. By this mechanism, small magnets and heavy current can be used, inasmuch as the current flows through the magnets for but a very short period of time.

Mechanism is provided whereby the total running time of each machine attached to the recorder is footed up in a convenient manner. This is accomplished through the medium of a shaft geared to the drum and carrying a series of totaling wheels whose peripheries are divided into spaces corresponding to the fractions of the day. These wheels revolve with their shaft, are held on the shaft by friction means and normally revolve therewith, but when any marker is in idle position, it throws a brake on the corresponding totaling wheel, so that the same is held stationary. Thus each totaling wheel revolves at a fixed speed as long as the marker is in running position, and only so long, and therefore the angular positions of these totaling wheels indicate the total length of time that any marker has been in running position. In this way any footing up of the work-indicating marks on the paper is made unnecessary. The markers, their magnets and the totaling mechanism are all mounted in a swinging frame which can be moved away from the drum for the purpose of inserting fresh paper and in front of this marker-frame there is a fuse-plate which incloses the operating parts and forms a base for a series of fuses to protect the marker-operating magnets.

The apparatus which forms the work-recorder proper can be used in connection with electrical-switch devices of various sorts adapted to be operated by the machines whose work is to be recorded when in use. I provide, however, in addition to the usual switch, a device which I term an adjustable-time cut-out. There are a great many classes of machines where separate operations are performed in relatively close succession and where a period of a few seconds must intervene between the operations to permit the operator to change his work. There is, therefore, with such machines, a certain amount of legitimate idle time, that is, time when the machine is in fact standing still but the workman is profitably employed. Such time ought to be registered as working rather than idle time, and the adjustable-time cut-out, as I have termed it, is so arranged that when any machine stops, its corresponding marker remains in running position for an adjustable period after such stopping. This cut-out mechanism can be adjusted in accordance with the character of the work to be done by the employee while the machine is standing still and it can also be adjusted in accordance with the speed of the individual workman. Thus in doing a given job of work, one man may require fifteen seconds delay in order to produce a continuous-work record, while another man may require but twelve seconds delay. The second man is obviously a more desirable employee, even though both are paid by the piece, because he is turning out more work with a given machine and thereby saving over-head expense. With the present apparatus it is possible to determine the efficiency of each workman and the amount of over-head expense he saves and to give each workman a bonus over the piece rate as a suitable reward for his greater efficiency. The adjustable-time cut-out, therefore, when applied to a machine of this character furnishes means whereby new information with reference to the workman's capacity can be obtained with perfect accuracy and whereby the present piecework systems can be modified in an equitable and desirable way.

Figure 16:
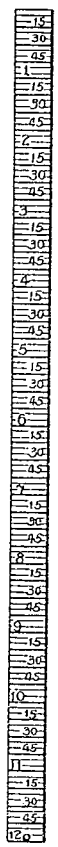
Figure 17:
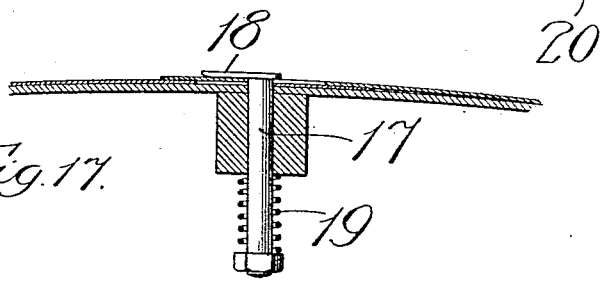

Having thus set out the general purpose and mode of operation of my improved apparatus, I will describe in detail the various parts thereof, having for reference the accompanying drawings in which Figure 1 is an end elevation, a portion being cut off on broken line 1 of Fig. 6, that is, the outer box and clock-movement being removed; Fig. 2 is a similar view showing the marker-frame swung away from the drum; Fig. 3 is a detailed section on the line 3 of Fig. 6; Fig. 4 is a horizontal section on the line 4 of Fig. 3; Fig. 5 is a vertical section on line 5 of Fig. 6, that is to say, an elevation of the most important parts from the opposite end of the machine from that shown in Fig. 1; Fig. 6 is a vertical section on the line 6 of Fig. 1; Fig. 7 is a section on the line 7 of Fig. 11; Fig. 8 is a front elevation of the marker-frame with the front or fuse-plate removed; Fig. 9 is a section on the line 9 and 13 of Fig. 8, the markers being shown, however, in idle position; Fig. 10 is a section on the line 10 of Fig. 9; Fig. 11 is a perspective view of one of the friction members whereby the totaling wheels are frictionally engaged with their shaft; Fig. 12 is a section on the line 12 of Fig. 14 through the upper end of one of the markers; Fig. 13 is a section on the line 9 and 13 of Fig. 8, the markers being in running position; Fig. 14 is a section on the line 14 of Fig. 13; Fig. 15 is an elevation of a portion of the ruled paper upon which the record is made, showing the mechanism by which the same is attached to the drum; Fig. 16 is a developed view of the periphery of one of the totaling wheels; Fig. 17 is a radial section on the line 17 of Fig. 15; Fig. 18 is a diagrammatic view showing one form of circuit diagram. Fig. 19 is an elevation of the adjustable-time cut-out showing its connections in diagrammatic form and Fig. 20 is an elevation of the adjustable-time cut-out, looking from the left-hand side as viewed in Fig. 19.

*The drum and its driving means.*

Referring to the drawings 1 and 2 are two standards having journals at their upper ends. The journal of the standard 1 supports and acts as a bearing for a sleeve 3 carrying a ratchet 4 engaged by pawl 5 (Figs. 5 and 6). The sleeve is attached to the inner end of a spring 6 whose outer end is fast in a spring-drum 7, secured to the drum-shaft 8. The left-hand end of said shaft extends into and receives support from sleeve 3. The end of the sleeve 3 is provided with notches which may be engaged by pin 9 extending transversely through a winding shaft 10, adapted to receive a winding handle and held in engagement with sleeve 3 through the medium of a spring 11. It will be obvious that as winding shaft 10 is rotated it will carry with it the sleeve 3 and ratchet 4 and wind up the spring from its inner end. The opposite or right-hand end of the drum shaft 8 is geared to a clock-movement 12 which may be provided with an escapement of any character. The clock-movement is not provided with any spring of its own, the spring 6 being sufficient for this purpose, but operates merely as an escapement to cause the drum-shaft to rotate at a fixed speed. 13 is the drum, loosely journaled upon the drum-shaft 8 and provided with a collar 14 opposed to a flange 15 which is keyed on the drum-shaft 8. 16 represents a clutching handle, the form of which is best illustrated in Figs. 1, 2 and 6, and which is threaded upon the flange 15 and has a bead turned over the collar 14, so that by its revolution it will press the collar and flange 14 and 15 together, and lock the drum firmly upon the drum-shaft, while permitting the same to be loosened, for setting purposes. The drum is provided with a series of radial clamping pins 17 (Fig. 17) each mounted so that it can rotate and move radially to a limited extent through the drum, and each being provided with a flat head 18 extending at right angles from the pin in one direction. Each pin is surrounded by a spring 19 which holds the head against the outer surface of the drum in the manner illustrated. 20, represents the paper upon which the record is made, the same being of sufficient length to go around the drum and to lap over slightly, as shown in Fig. 15. Each end of the sheet is provided with perforations of a size corresponding to the size of the heads 18 upon the paper clamping pins 17. When the paper is wrapped around the drum these perforations register only to an extent equal to the diameter of the pins 17. In placing the paper upon the drum, one end is positioned and its perforations are slipped over the heads of the pins 19. The heads are then turned in the opposite direction. The other end of the sheet is then brought around and slipped over the heads, and the heads are turned back, thus locking both ends of the paper, as shown in Fig. 17. The foregoing concludes the description of the drum, its driving mechanism and the paper-attaching means.

*The markers, marker-frame and marker-actuating means.*

Eight of the markers at the left-hand end of the machine, as shown in the drawings, are designated by the characters 21 and 28 inclusive. The markers are of four lengths, 21 and 22 being the longest, 23 and 24 somewhat shorter, 25 and 26 still shorter and 27 and 28 the shortest. The markers all receive pivotal support from a marker-pivot-plate 29 (Figs. 13 and 14) and the pivots are arranged in such a way that the upper ends of the markers will fall in line and the pivots will fall at substantially the center of the markers.

Each marker has a flattened lower end serving as an armature, the armature-ends on the markers 21, 23, 25 and 27 being turned backward to a point behind the marker-pivot-plate and the armature-ends on the markers 22, 24, 26 and 28, being turned forward (Figs. 13 and 14). The armature-ends of the markers 21 and 23 are located below the lower edge of the marker-pivot-plate, but the lower edge of the markers 25 and 27, pass through perforations provided for the purpose in the marker-pivot-plate in the manner illustrated. The alternate markers thus have their armature-ends turned backward and forward and the armature ends fall at four different levels.

The marker-pivot-plate 29 is secured at its end to, and supported by two marker-frame end-plates 30 and 31 respectively, which also supports front and rear switch-plates 32 and 33 respectively. These various plates are all rigidly secured together and form the main members of the marker-frame. The front and rear switch-plates support electromagnets arranged in pairs, one on each side of each armature-end. These magnets are indicated in the drawings by the letters I and R, respectively, the magnets I, being used for moving the markers to idle position and those marked R being used to move the markers in running position. When the particular machine illustrated is viewed from the front, the idle magnets I, will be to the left of the armature-ends of the markers, and the running magnets R, will be to the right thereof. On the switch-plate are supported blocks 34, of insulating material, each of which carries two metal contacts $r$ and $i$ on the two lower corners of said blocks. On each of blocks 34 are pivoted two arms 35 and 36, each arm 35 carrying at its lower end a movable contact 37 which is adapted to engage alternatively with the two contacts $i$ and $r$. The extreme ends of arms 35 and 36 are connected by a spring 38, which, as the arms are oscillated swing past the dead center. The arms are pivoted between their ends, and their adjacent ends overlap and are bifurcated as illustrated to receive the ends of pins 39 carried by the armature-ends of the markers, the blocks 34 being medially slotted to provide for the entrance and movement of said pins 39. This mechanism is termed hereafter a "cut-off-switch."

Having thus set forth the mode of construction and arrangement of the markers and their actuating means, reference will be made to Fig. 18 from which the method of operation will be made clear. For purposes of illustration the mechanism is shown as coöperating with a saw. 40 is a main switch, having two contacts $r^1$ and $i^1$. This switch is controlled by the belt-shifter in such a way that when the belt is on the loose pulley the movable arm of the switch will have its arm on the contact $i^1$ and when on the tight pulley, on the contact $r^1$. 41 is a production switch having running and idle contacts $r^2$ and $i^2$, respectively. This switch is arranged so that the tip of its movable arm is thrown onto the running contact $r^2$ whenever boards are actually passing through the saw. 42 is a battery connected with a movable arm of main switch 40. From the running contact $r^1$ of this main switch, a wire 43 runs to the movable arm of the production switch 41. From the running contact in that switch a wire 44 carries the circuit to the running magnet R from whence it is led by a wire 45 to the contact $r^1$ of the cut-off switch, corresponding to the pair of magnets in question. The idle contacts $i^1$ and $i^2$ on the main and production switches are connected together by wires 46 and 47 and to a wire 48 which conducts the circuit to the idle magnet I from whence it is led by a wire 49 to the idle contact $i$ on the cut-off switch corresponding with the magnets in question. The opposite pole of the battery is connected with a swinging arm 35 to the cut-off switch.

The mode of operation of the parts illustrated in Fig. 18 will be readily apparent. All the parts are shown in that figure in running position. The moment the production switch is moved to the point where its arm strikes the contact $i^2$, that is, the moment the saw ceases doing useful work, the current will flow from the positive side of the battery 42 through the main switch, the wire 43, the production switch, wires 47 and 48, the idle magnet I, the wire 49, the idle contact $i$, the arm 35 of the cut-off switch and back to the battery. This will energize the idle magnet I, drawing the marker into idle position. As this occurs the adjacent ends of the arms 35 and 36 of the corresponding cut-off switch will be moved to one side, past the dead center, and simultaneously the springs 38 will pass the dead center, thus moving the movable contact 37 on the arm 35 off the idle contact $i$ onto the running contact $r$, thus cutting off the current going through the idle magnet. In a similar way, if a workman should attempt to defeat the purpose of the recorder by leaving a board in place in the saw and shifting his belt to stop the machine, the main switch will go to idle position and the current will flow from the battery through the main switch, the contact $i^1$ to the wire 46 and from thereon in exactly the same course as before, producing corresponding results. When the marker is in idle position, however, if both the main and production switches are set in running position the current will flow from the battery through the point $r^1$ on the main switch, the wire 43, the point $r^2$ of the production switch, the wire 44, through the running magnets, the wire 45 to the contact $r$. The moment when the last of these switches goes into running position, the contact 37 will of course be lying upon the running contact $r$, so that the current can complete its circuit back to the battery, thus energizing the running magnets and moving the parts into the position as shown in Fig. 18 and instantly cutting off the current so as to avoid wasting it. It is evident that in machinery where there are more than two methods by which productive work can be stopped, switches might be provided similar to the main and production switches whereby the idle magnet will be energized whenever any switch goes to idle position, and whereby the running magnet will be energized only when all the switches are in running position. Similarly, if there be a machine having two different points of work, either one of which might be usefully employed, the switches must be so wired that when either switch is in running position the running magnet will be energized, while only when both are in idle position will the idle magnet be energized. The requirements of various machines will necessitate variations in the method of wiring, but these variations are usually quite simple and can readily be performed by any skilled electrician.

On the front of the marker-frame is secured a fuse-plate 50, carrying a series of fuses which protect the various magnets, this fuse-plate being arranged to be readily removed from place and serving as a cover for the interior mechanism.

The marker-frame is pivoted at its lower end, so that it can swing partly back and forth from the position shown in Fig. 1 to that shown in Fig. 2. Extending along the upper part of the marker-frame, and journaled between the end-plates thereof, is a rock-shaft 51, having, on the outside of the frame at each end, radial arms 52 and 53, the arm 53 being prolonged beyond its pivot and provided with an operating handle 54. The radial arms 52 and 53 are connected to links 55 and 56, pivoted to the standards 2 and 1, respectively, these links being curved at their ends so that their pivoted arms will pass the dead center and the link 55 being held downward by means of the spring 57. As a result of this construction, by swinging the operating handle 54 backward from the position shown in Fig. 5, the part will move from the position shown in Fig. 1 to that shown in Fig. 2, thus releasing the paper on the drum from contact by the markers and preparing the way for changing sheets. Forward movement of the marker-frame is limited by engagement of a tip 58 on the arm 53 with a pin 59, mounted on the marker-frame end-plate.

*The totaling mechanism.*

A shaft 60 is journaled in the upper part of the marker-frame, extending therethrough from end to end and being provided, at its left-hand end with a hand wheel 61 whereby it can be rotated for the purpose of setting back the totaling mechanism, and being provided at its opposite end with a miter gear 62. Secured to the standard 2 is a stub shaft 63 (Fig. 4) upon which is rotatably mounted a pinion 65 driven by a pinion on the drum-shaft, said pinion 65 being rigidly secured to a miter gear 66. Outside this miter gear 66 is a collar 67, rotatable on the shaft 63, and having a radially projecting part 68, which furnishes bearing for the rear end of a shaft 69, upon which is rigidly secured a sleeve 70 carrying a miter gear 71 in mesh with the miter gear 66. On the opposite end of the sleeve 70 is one clutch member 72 adapted to be engaged by a similar clutch member 73 loose upon the shaft 69. The clutch member has rigidly fixed upon it a miter gear 74 which meshes with the miter gear 62 on the shaft 60, the two miter gears 62 and 74 being held in engagement by shaft 75, and a guiding frame 76. This construction is such and the gears are so proportioned that the shaft 60 will turn with the same angular velocity as the drum-shaft 8 and drum thereon, when the clutch members 72 and 73 are in engagement. This engagement takes place when and for such periods as the marker-frame is swung backward, but when the marker-frame is swung forward as shown in Fig. 2 the clutch members disengage and the clutch member 73 and the parts forward thereof, move forward with the marker-frame. When the marker-frame is in this forward position, the shaft 60 can be revolved through the medium of the hand wheel 61, but when in its rear position the shaft 60 will be rigidly geared through the clutch mechanism to the clock-movement and can move only therewith. The shaft 60 has upon it a series of totaling wheels 77, one for each marker. These wheels 77 are in the form of hollow drums open on one side, each having a projecting flange 78, provided with ratchet teeth as illustrated in Fig. 9, and the main portion of the periphery of each totaling wheel bearing numbers corresponding to the fractions of the day as illustrated in developed form in Fig. 16. Within the hollow of each totaling wheel is a disk 79 fast on the shaft 60, each disk confining between itself and the flat face of the corresponding totaling wheel, a sheet-metal friction-member 80, the form of which is best illustrated in Fig. 11. The disks 79 are so positioned that each forms a lateral bearing for the next adjacent totaling wheel to the right (Fig. 10). It will be evident from the foregoing construction that the totaling wheels will tend normally to rotate with shaft 60 and thus make one revolution for each revolution of the drum.

Mechanism is provided whereby each marker when in idle position will throw a brake on its corresponding totaling wheel, thus rendering same stationary and causing it to slip with reference to the shaft 60. This brake mechanism is best illustrated by Figs. 9 and 13. A shaft 81 extends longitudinally through the marker-frame from end to end, such shaft being of light material and being steadied by lying in a groove cut in the upper surface of a strip 82. Brake-levers 83 are pivoted to this shaft and lie in slots cut in this strip 82. The forward end of each brake-lever carries a brake-shoe 84 of leather in position to engage with the ratchet teeth on the flange 78 of the corresponding totaling wheel. The forward end of each brake-lever is held down by means of a spring 85. The rear end of each brake-lever is turned upward and formed into a cam 86 adapted to be engaged by a roller 87 on the corresponding marker. The cam is shown in a side elevation in Fig. 9, in the top plan of Fig. 7 and its exact form is indicated in Fig. 8. When any given marker moves into running position, its roller 87 engages the corresponding cam 86 raising the brake-shoe 84 from the totaling wheel and permitting the same to revolve with the shaft 60, and when the marker moves back into idle position, it releases the brake-lever permitting its shoe to be drawn down by means of this spring 85 so as to stop the rotation of the corresponding totaling wheel.

For the purpose of raising all of the brake-shoes at once in order that the totaling wheels may be set back to their initial point, a movable cross-bar 88, normally held downward by a spring 89, is extended through the upper part of the marker-frame, immediately below the forward ends of the brake-levers. This bar is pivoted at its lower rear edge (dotted lines Fig. 13) and has a downwardly turned end 90 (Figs. 1 and 2), which is in position to be engaged by a radial arm 91 on one end of the rock-shaft 59. Thus when the marker-frame is moved forward in the manner already described, this arm 91 will strike the end 90 on the bar 88 and will move the same from the position shown in Fig. 9 to that shown in Fig. 13, thereby elevating all the brake-shoes. Disengagement will take place immediately before the marker-frame reaches the limit of its forward movement.

The front of the marker-frame carries a plate 92 and each totaling wheel has a pin 93 adapted to engage therewith, the pin being located opposite the starting point of the time of marking on the totaling wheel. Thus all these totaling wheels are in starting position when the pin lies just on the upper side of the plate 92 as shown in Fig. 13. In setting back the totaling wheels therefore, it is only necessary to turn the shaft 60 by means of a hand wheel until all of the pins strike this plate and the various totaling wheels are then alined ready for a fresh day's operation.

*Other features of the recorder proper.*

For the purpose of preventing the drum from overrunning, it is provided on its periphery with a tip 94, which engages with the upper edge 95 of an opening in the marker-pivot-plate, thus making it impossible for the drum to continue its rotation and confuse the record after the markers have made one complete circuit thereof.

The particular character of the marker point is obviously material to the general features of the present invention. I have found it particularly convenient, however, to use chemically-prepared paper of the character upon which brass or German silver will make a distant mark. In this way, it is possible to avoid the use of destructible points. In the particular form of markers herein illustrated, each carries at its upper end a boss 96 which lies in a direction radial to the drum. The boss is closed at its rear end by a plug through which is passed a pin 97 surrounded by a spring 98, the pin carrying at its rear end a longitudinally movable tube 99 which carries at its rear end a marker-point 100.

The foregoing completes the description of the recorder proper, and it is believed that, from the description of the construction and such incidental discussion of its operation as has occurred in connection with such description, that no detailed discussion of the operation of the entire machine will be necessary.

*The time cut-out.*

I shall, therefore, proceed to the description of the adjustable-time cut-out, which is illustrated in Figs. 19 and 20. 101 indicates the production switch of the adjustable-time cut-out which is in a suitable manner connected to the machine whose work is to be recorded. $r^3$ is the running contact of this switch and the switch has no idle contact. 102 is a generator, one pole of which is connected by a wire 103 with the arm of the production switch 101 and the other pole of which, is connected by wire 104 with the ground wire of the machine-recorder, and thus is connected to the swinging arm of each of the cut-off switches. The running contact $r^3$ of this production switch is connected by a wire 105 with the running magnets of the corresponding markers, this wire 105 corresponding exactly to the wire 44 in Fig. 18. Thus when the production switch 101 moves to a running position, the corresponding marker is moved to a running position in exactly the manner already described and the circuit is then broken within the machine recorder at the cut-off switch. At the same time, however, the current is likewise led through a shunt including a wire 106, an electro-magnet 107 and a wire 108, back to the wire 104, thus energizing the electromagnet 107 which remains energized as long as the production switch 101 stays in running position. $108^a$ is the armature of the magnet 107, the same being pivoted as illustrated and normally held away from said magnet by means of a spring 109. The armature $108^a$ carries at its upper end a spring-dog 110 and also a contact-closing piece 111. 112 is an adjustable lever, having at its upper end an insulating block which carries two contacts 113 and 114 in the form of the forks between which the contact-closing piece 111 can pass, operating therewith as a knife switch. The contact 114 is connected by a wire 115 to the wire 103 leading to the one pole of the generator, and the wire from the contact 113 runs to the idle magnet of the corresponding marker within the machine-recorder, this wire corresponding to the wire 48 in Fig. 18. Thus, when the armature $108^a$ moves away from its magnet 107 it closes the break between the contact 113 and 114 and the current flows through the idle magnet, setting the corresponding marker to idle position.

116 is a shaft, driven at a fixed speed by motor 117 connected therewith by a worm or other suitable gear. The shaft 116 carries a ratchet-wheel 118, the teeth of which engage with the spring-dog 110 on the end of the armature $108^a$. This construction is such that as long as the magnet 107 is energized, that is, as long as the production switch 101 remains in running position, the teeth will snap past the dog 110 without producing any effect thereon. The moment the production switch moves to idle position and the magnet 107 is deënergized, the spring 109 will tend to move the armature 108 away from the magnet, but this movement is prevented by engagement of the spring-dog 110 with the teeth on the ratchet-wheel 118. These teeth are, however, in slow motion in the direction indicated by the arrow in Fig. 19 and this slow motion permits the armature to move over in a definite length of time and close the break between the contact 113 and 114, thus causing the corresponding marker to go to idle position. The lever 112 is adjustable and its angular position will determine the amount of space through which the armature 108 must move, and therefore, the length of time which must necessarily be consumed after the production switch goes to idle before the marker makes a corresponding movement. An indicating scale 119 is provided, so that the lever may be set readily in position which will produce the desired time interval.

The result of this construction is obviously that set out in the opening description of the general mode of operation, that is, if a workman stops to change work, the marker will not go to idle position for an adjustable length of time after this machine stops and if he changes his work and gets his machine started within a suitable interval, which interval can be adjusted for each man, his record on the sheet will remain perfect.

The foregoing machine and its connections, form a peculiarly desirable combination. It accomplishes its work in a simple and efficient manner and its parts are of such forms as to be relatively easy to manufacture and assemble. Means are provided whereby a perfectly regular movement of the drum is made possible. The totaling mechanism is a great convenience, especially when combined with the simple and easy means for setting it back. The construction of the totaling mechanism is peculiarly simple and adds but little to the necessary complications of the machine. The use of the cut-off switches makes it possible to use small magnets, and relatively heavy current without danger. The use of small magnets renders it possible to build a machine in simple and compact form. The adjustable-time cut-out adds enormously to the efficiency and the desirability of the device and enables it to perform many functions which would otherwise be impossible.

I realize that considerable changes are possible in the arrangement herein described without departing from the spirit of my invention and I do not intend, by having described the same in detail, to limit myself to the particular form herein set forth, except as pointed out in the following claims.

What I regard as new and desire to secure by Letters Patent, is—

1. In combination means for moving a record-sheet, a series of markers each adapted to occupy two alternative positions, two electro-magnets for each marker adapted to move the same from one position to the other, switch devices controlled by the machine whose work is to be recorded and arranged to close the circuit through the electro-magnets alternatively, and a cut-off switch for each pair of magnets arranged when the marker is moved to one position to break the circuit through the magnets which caused this movement and to close a break in the circuit which energizes the other magnet, thereby preparing said other circuit to be closed by said switch device controlled by the machine.

2. In combination means for moving a record-sheet, a series of markers adapted to occupy two alternative positions, idle and running magnets to move the markers from one position to another, a cut-off switch for each magnet each having an arm movable with its marker and two contact points one connected to one terminal of each of said magnets, a switch device operated by the machine whose work is to be recorded and having running and idle contact points, connections from the arm of the cut-off switch through a source of electric-current to the switch device, and connections from the running and idle contact points of the switch device to the running and idle magnets.

3. The combination with a drum adapted to carry a record-sheet, of a series of pivoted markers in continuous engagement therewith, one pair of magnets for each marker adapted to shift the same lengthwise of the drum, a switch device controlled by the machine whose work is to be recorded and arranged to close the circuit through said electro-magnets alternatively, and a cut-off switch for each pair of magnets arranged when the marker is moved to one position to break the circuit through the magnet which caused its movement and to close a break in the circuit which energizes the other magnet, thereby preparing said circuit to be closed by said switch device controlled by the machine.

4. The combination with a drum adapted to carry a record-sheet, of a series of pivoted markers in continuous engagement therewith, a pair of magnets for each marker adapted to shift the same longitudinally of the drum, running and idle magnets adapted to move the markers from one position to another, cut-off switches each having an arm movable with its marker and having two contact points, one connected to each terminal of said running and idle magnets, a switch device operated by the machine whose work is to be recorded and having running and idle contact points, connections from the arm of the cut-off switch through a source of electric-current to the switch device, and connections from the running and idle contact points of the switch device to the running and idle magnets.

5. The combination with a drum adapted to carry a record-sheet and a marker-frame having a series of markers pivoted therein in a series extending longitudinally of the drum, of two sets of pairs of magnets, one pair for each marker on opposite sides thereof to reciprocate the same, the two sets of pairs being to the front and rear of each other, switch devices controlled by the machines whose work is to be recorded, and connections between the switch devices and magnets.

6. The combination with a drum adapted to carry a record-sheet, and a marker-frame having a series of markers pivoted therein in a series extending longitudinally of the drum, of two sets of pairs of magnets, one pair for each marker on opposite sides thereof to reciprocate the same, the two sets of pairs being to the front and rear of each other and the pairs of each set being arranged in a plurality of tiers one above the other, the pairs in each tier being staggered with reference to those in the adjacent tiers, switch devices controlled by the machines whose work is to be recorded, and connections between the switch devices and magnets.

7. In combination, a time-recording device, an electro-magnet for controlling the same, a machine of which one state is to be recorded, two switches so connected that both will be closed during the state to be registered and either or both will be open during other states, and a series connection through said two switches and said electro-magnet.

8. The combination with a machine, one of whose operative states is to be recorded and in which two separate conditions must coincide during the state to be recorded, of two switches arranged to be respectively closed during the respective conditions, a time recorder, an electro-magnet for controlling the same and a series connection through the switches and electro-magnet whereby said magnet is energized and the recorder operative only when both conditions coincide.

9. The combination with a machine whose periods of productive operation are to be recorded and in which two conditions must coincide during productive operation, a main switch arranged to be closed during one condition, a production switch arranged to be closed during the other condition, a time recorder, an electro-magnet for controlling the same, and a series connection through the switches and electro-magnet whereby said magnet is energized and the recorder operative only when both conditions coincide.

10. The combination with a machine whose periods of productive operation are to be registered, a main switch arranged to be closed while the machine is running, a production switch arranged to be closed while there is work in the machine, a time recorder, an electro-magnet for controlling the same, and a series connection through the switches and electro-magnet whereby said magnet is energized and the recorder operative only when both conditions coincide.

11. The combination with a record-carrying drum, and switches operated by the machines whose work is to be recorded, of a marker-frame movably pivoted with reference to the drum whereby the same may be moved toward and from the drum and bodily removed from place if desired, markers and marker-actuating means in the marker-frame, and connections between the marker-actuating means and the switches.

12. The combination with two switches operated by a machine whose work is to be recorded, both of which must be in one position to indicate one state of said machine, and either of which in the other position will indicate another state of said machine, of a marker, an electro-magnet for moving the same and a series connection running through said electro-magnet and said two switches when the said two switches are in their first-named position, a second electro-magnet for moving said marker and a multiple arc connection between such second magnet and said switches when in said second position.

13. In combination, record-carrying means, time mechanism for actuating the record-carrying means, a series of markers, means for moving the markers into running and idle positions corresponding to the state of the machine whose work is to be recorded, a series of time totaling devices one for each marker, means for actuating each time-totaling device when its marker is in one position, and means for arresting the movement of each time totaling device when its marker is in its other position.

14. The combination with record-carrying means, a series of markers, electro-magnetic means for moving the markers into idle and running positions corresponding to the state of the machine whose work is to be recorded and totaling means arranged to indicate the total time each marker has been in one position, and means for setting all said totaling devices back to an initial point by one operation.

15. In combination, record-carrying means, a marker, a time totaling device, a single electro-magnet controlling the marker and the time totaling device, a machine whose work is to be recorded, and a machine-controlled switch controlling said electro-magnet.

16. In combination, record-carrying means, a marker, a time-totaling device, an electro-magnet, an armature moved thereby and controlling the marker and the time-totaling device, and a machine controlled switch controlling said electro-magnet.

17. The combination with record-carrying means, a series of markers, electro-magnetic means for moving the markers into idle and running positions corresponding to the state of the machine whose work is to be recorded, a rotating shaft, totaling wheels frictionally held on said shaft and brake mechanisms operated by the respective markers when in one position to put a brake upon the corresponding totaling wheels, and arresting means for said totaling wheels whereby when said shaft is rotated to set back said wheels, they will be arrested in line.

18. The combination with record-carrying means, a series of markers, electro-magnetic means for moving said markers into idle and running positions corresponding to the state of the machine whose work it is desired to record, a rotating shaft, totaling wheels frictionally held on said shaft and brake mechanism controlled by the respective markers when in one position for putting a brake upon said totaling wheels, and means for raising all said brakes simultaneously for setting back the wheels.

19. The combination with record-carrying means a series of markers, electro-magnetic means for moving said markers into idle and running positions corresponding to the state of the machine whose work it is desired to record, a rotating shaft and brake mechanism controlled by the respective markers when in one position for putting a brake upon said totaling wheels, a marker-frame movable from said record-carrying means and containing said markers and totaling mechanism and means whereby the movement of said frame from the said record-carrying means will raise all said brakes.

20. In combination a record-carrier, a marker, electro-magnetic means for causing the marker to occupy running or idle positions, an electric-switch device controlled by the machine whose work is to be recorded and arranged to cause the movement of the markers to running position when the machine starts and to cause its movement to idle position, a determined time after the machine stops.

21. In combination record-carrying means, a marker, a machine whose work is to be recorded, means for moving said marker to running position when the machine starts, and means for moving said marker to idle position a predetermined time after the machine stops.

22. In combination record-carrying means, a marker, a machine whose work is to be recorded, means for moving said marker to running position when the machine starts, and means for moving said marker to idle position a predetermined time after the machine stops, and means for adjusting the time which elapses after the machine stops before said marker is moved.

23. In combination record-carrying means, a marker, electro-magnetic means for controlling the marker, a switch, connections between the switch and said electro-magnetic means constructed and arranged so that when the switch reaches a given position, the marker moves to idle position, a machine whose work is to be recorded connected to said switch to start the same in motion toward said position and means for adjusting the time consumed by said switch in reaching said position whereby the recorder will indicate as running time a certain period after the machine is actually stopped.

24. In combination record-carrying means, a marker, electro-magnetic means for controlling the marker, a switch, connections between the same and said electro-magnetic means arranged so that when said switch reaches a given position the marker will move to idle position, a machine whose work is to be recorded connected to said switch to start the same in motion toward said position when the machine is stopped, and means for adjusting the space through which said switch moves to reach said position.

25. In combination record-carrying means, a marker, electro-magnetic means for moving the marker, a switch, connections between the switch and said electro-magnetic means whereby when the switch reaches a given position, the marker will go to idle position, a machine whose work is to be recorded, means tending to move the switch to said position at fixed relatively slow speed, means holding the switch stationary as long as the machine is working and arranged to release the switch when the machine stops, whereby when the machine stops said switch will reach said position after a determined interval whereupon the marker will move to idle position.

26. In combination record-carrying means, a marker, electro-magnetic means for moving the marker, a switch, connections between the switch and said electro-magnetic means whereby when the switch reaches a given position, the marker will go to idle position, a machine whose work is to be recorded, means tending to move the switch to said position at a fixed relatively slow speed, means holding the switch stationary as long as the machine is working and arranged to release the switch when the machine stops, whereby when the machine stops said switch will reach said position after a determined interval whereupon the marker will move to idle position, and means to vary the time occupied by said movement of the switch.

27. In combination record-carrying means, a marker, electro-magnetic means for moving the marker, a switch, connections between the switch and said electro-magnetic means whereby when the switch reaches a given position, the marker will go to idle position, a machine whose work is to be recorded, means tending to move the switch to said position at a fixed relatively slow speed, means holding the switch stationary as long as the machine is working and arranged to release the switch when the machine stops, whereby when the machine stops said switch will reach said position after a determined interval and then the marker will move to idle position, and means to vary the space through which the switch moves.

28. In combination record-carrying means, a marker, electro-magnetic means for moving the marker, a switch, connections between the said switch and said electro-magnetic means whereby when said switch reaches a given position the marker will go to idle position, a machine whose work is to be recorded, a pawl on said switch, a constantly rotated ratchet engaging the pawl and rotating in the direction in which the pawl and ratchet engagement prevents movement of the switch relative to the ratchet, means for holding the switch in a fixed position as long as the machine is working and only so long, whereby when the machine stops work, the switch will move with the ratchet toward said position and when it reaches it, the marker will go to idle position.

29. In combination record-carrying means, a marker, electro-magnetic means for moving the marker, a switch, connections between the said switch and said electro-magnetic means whereby when said switch reaches a given position, the marker will go to idle position, a machine whose work is to be recorded, a pawl on the switch, a constantly rotated ratchet engaged with a pawl and rotating in the direction in which the pawl and ratchet engagement prevents the movement of the switch relative to the ratchet, means for holding the switch in a fixed position as long as the machine is working and only so long, whereby when the machine stops work the switch will move with the ratchet toward said position and when it reaches it the marker will go to idle position, and means for adjusting the space through which the switch moves before reaching said position.

30. In combination record-carrying means, a marker capable of occupying two alternative positions, two circuits, two electro-magnets one in each circuit for moving the marker to said positions, a cut-off switch having a contact in series with each electro-magnet, an arm to engage with each contact, said arm being a part of the circuits alternatively according to the position it occupies, a connection between the arm and the marker whereby when one electro-magnet is energized the arm will swing from the contact in series with said electro-magnet into contact with the other, thus breaking the circuit through said magnet and closing the gap in the circuit through the other, a machine whose work is to be recorded and means controlled by said machine to open and close the circuits through said electro-magnets.

31. In combination record-carrying means, a marker capable of occupying two alternative positions, two circuits, two electro-magnets one in each circuit for moving the marker to said positions, a cut-off switch having a contact in series with each electro-magnet, an arm to engage with each contact, said arm being a part of the circuits alternatively according to the position it occupies, a connection between the arm and the marker whereby when one electro-magnet is energized the arm will swing from the contact in series with said electro-magnet into contact with the other, thus breaking the circuit through said magnet and closing the gap in the circuit through the other, a machine whose work is to be recorded and means controlled by said machine to open and close the circuits through said electro-magnets, a spring to hold said arm in two positions and arranged to swing over the dead center as the arm is shifted.

32. In a machine-recorder, a pair of electro-magnets, a marker pivoted to swing between the electro-magnets and a cut-off switch having two contacts, each in series with one electro-magnet, a pair of arms pivoted between their ends, one engaging with the contacts, a spring connecting the opposite ends of the arms, notches in the adjacent ends of the arms and a pin on the marker engaging said notches substantially as described.

33. In combination with a record-carrying device and a marker-frame movable with reference thereto, markers and marker-actuating means therefor, a shaft carried by said marker-frame, totaling wheels propelled by said shaft, gearing between said shaft and record-carrying means including a clutch which is in engagement when the marker-frame is moved toward the record-carrying means and out of engagement when it is away therefrom whereby the shaft is driven when the markers are in registering relation and can be adjusted when the markers are out of registering position.

34. In combination record-carrying means, a marker, a pair of electro-magnets adapted to move the marker when energized to running and idle positions, a machine whose work is to be recorded, a switch operated thereby to be closed only when the machine is running, a source of electric current, a circuit through said switch, source of electric current and one of said marker-operating magnets, a cut-out electro-magnet, a circuit running through said machine-operated switch and said cut-out electro-magnet whereby said magnet is energized when the machine is operated, an armature for said cut-out electro-magnet, switch mechanism operated by said armature when in one position, a circuit through said source of electric current, said switch mechanism and the other of said operating magnets and means for moving the armature of said cut-off electro-magnet at a predetermined speed from the time when the cut-out electro-magnet is deënergized until it closes the switch mechanism controlled by it.

35. In combination record-carrying means, a marker, a pair of electro-magnets adapted to move the marker when energized to running and idle positions, a machine whose work is to be recorded, a switch operated thereby to be closed only when the machine is running, a source of electric current, a circuit through said switch, source of electric current and one of said marker-operating magnets, a cut-out electro-magnet, a circuit running through said machine-operated switch and said cut-out electro-magnet, whereby said magnet is energized when the machine is operated, an armature for said cut-out electro-magnet, a switch mechanism operated by said armature when in one position, a circuit through said source of electric current, said switch mechanism and the other of said marker-operating magnets, means for moving the armature of said cut-out electro-magnets at a predetermined speed from the time when the cut-out electro-magnet is deënergized until it closes the switch controlled by it, and means for adjusting the time occupied by said armature in its movements.

36. The combination with a continuously moving record sheet, of means for driving said sheet, an accumulator driven thereby and in synchronism with the movement of said sheet, an electric circuit, an intermittently and automatically actuated switch interposed in said circuit, a recorder interposed in said circuit and actuated to make a continuous record on said sheet during a predetermined position of said switch, a friction gear interposed between said accumulator and said drive mechanism, and a brake actuated by the movement of said recorder to stop the drive of said accumulator during one position of the recorder and to release the accumulator during another position of the recorder.

37. The combination with a continuously moving recorder sheet, of drive mechanism therefor, an accumulator driven by said mechanism in synchronism with the movement of said sheet, a friction gear interposed between said accumulator and said drive mechanism, a recorder electrically actuated to intermittently make a continuous record on said sheet, and a brake actuated by the movement of said recorder to stop the drive of the accumulator during one position of the recorder and to permit the drive of the accumulator during another position of the recorder whereby said accumulator shows currently the totals of said records made by the recorder.

38. In a recording device, the combination of a base, a power shaft superposed on said base, means for rotating said power shaft, a clock mechanism adapted to control the rotation of said power shaft in one direction only, a drum and a chart also superposed on said base and adapted to be moved by said power shaft, and a plurality of marking and accumulating devices each thereof having operative connection with said power shaft, substantially as described.

39. A combined marking and accumulating unit, comprising in combination, a frame, a marking arm mounted for oscillation, accumulator mechanism, a magnet controlling the oscillation of said arm and a brake movable in unison with said marking arm and adapted to permit the operation of the accumulator mechanism in one position of said marker, substantially as described.

PETER ALBERT COONEY.

In presence of—
J. G. ANDERSON,
R. A. SCHAEFER.

Copies of this patent may be obtained for five cents each, by addressing the "Commissioner of Patents, Washington, D. C."